(12) United States Patent
Hagihara et al.

(10) Patent No.: US 6,454,820 B2
(45) Date of Patent: Sep. 24, 2002

(54) POLISHING COMPOSITION

(75) Inventors: Toshiya Hagihara, Wakayama; Koichi Naito, Tokyo; Shigeo Fujii, Wakayama, all of (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/772,906

(22) Filed: Jan. 31, 2001

(30) Foreign Application Priority Data

Feb. 3, 2000 (JP) ........................................ 2000-026784

(51) Int. Cl.7 ............................. C09K 3/14; C09G 1/02; C09G 1/04; B24B 1/00

(52) U.S. Cl. ............................. 51/308; 106/3; 252/79.2; 252/79.4; 510/167; 216/96; 216/89; 216/103

(58) Field of Search ........................ 51/307, 308; 106/3; 438/692, 693; 252/79.2, 79.4; 510/167, 397; 216/96, 89, 102, 103

(56) References Cited

U.S. PATENT DOCUMENTS

| | | | | |
|---|---|---|---|---|
| 4,954,142 A | * | 9/1990 | Carr et al. | 51/309 |
| 5,858,813 A | * | 1/1999 | Scherber et al. | 438/693 |
| 5,993,686 A | * | 11/1999 | Streinz et al. | 252/79.3 |
| 5,997,620 A | * | 12/1999 | Kodama et al. | 51/309 |
| 6,258,140 B1 | * | 7/2001 | Shemo et al. | 51/308 |

FOREIGN PATENT DOCUMENTS

| | | | |
|---|---|---|---|
| EP | 967260 | * | 12/1999 |
| JP | 10204416 | | 8/1998 |
| JP | 11167711 | | 6/1999 |

* cited by examiner

*Primary Examiner*—Michael Marcheschi
(74) *Attorney, Agent, or Firm*—Birch, Stewart, Kolasch & Birch, LLP

(57) ABSTRACT

A polishing composition comprising silica particles, water, and Fe salt and/or Al salt of a polyaminocarboxylic acid; a polishing process comprising applying the polishing composition; a process for manufacturing a magnetic disk substrate, comprising the step of polishing a substrate with the polishing composition; a magnetic disk substrate manufactured by applying the polishing composition.

16 Claims, No Drawings

POLISHING COMPOSITION

BACKGROUND OF THE INVENTION

1. Field of the Invention

The present invention relates to a polishing composition. More particularly, the present invention relates to a polishing composition which improves a polishing rate, and reduces surface roughness (Ra) and waviness (Wa), thereby giving a high-quality polished surface; a polishing process using the polishing composition; a magnetic disc substrate having improved surface smoothness; and a process for manufacturing the magnetic disc substrate.

2. Discussion of the Related Art

There have been ever increasing demands for improving the recording density of the hard disc, and in order to reduce the floating amount of the magnetic head, it has been required to improve the degree of flatness (surface smoothness) of the disc substrate. Concretely, there have been required to have such surface smoothness that each of the surface roughness (Ra) and the waviness (Wa) of the disc substrate is 3 Å or less. Especially, it has been a great concern to reduce waviness which causes breakdown of the magnetic disc devices or causes errors in read-write of information. Conventionally, in order to obtain a desired surface smoothness, there has been carried out a process comprising polishing a substrate with a polishing liquid comprising abrasive grains such as alumina, and thereafter further polishing with a polishing liquid comprising silica particles having finer sizes as abrasive grains. However, the polishing liquid using the silica particles has a defect of slow polishing rate, so that a further improvement in the polishing rate has been required. For instance, there have been proposed a process comprising adding a compound such as iron citrate, iron oxalate or iron chloride to a polishing liquid comprising abrasive grains composed of silica particles in Japanese Patent Laid-Open No. Hei 11-167711; a process comprising adding a colloidal silica and a compound such as iron citrate, ammonium iron citrate or ammonium iron oxalate in Japanese Patent Laid-Open No. Hei 10-204416; and the like. In both methods, the improvements in the polishing rate is insufficient.

An object of the present invention is to provide a polishing composition which can increase a polishing rate and give little surface defects such as scratches and pits, and improves surface smoothness such as surface roughness (Ra) and waviness (Wa); a polishing process using the polishing composition; a magnetic disc substrate having improved surface smoothness such as surface roughness (Ra) and waviness (Wa); and a process for manufacturing the magnetic disc substrate.

These and other objects of the present invention will be apparent from the following description.

SUMMARY OF THE INVENTION

According to the present invention, there are provided:
[1] a polishing composition comprising silica particles, water, and Fe salt and/or Al salt of a polyaminocarboxylic acid;
[2] the polishing composition according to item [1] above, further comprising an inorganic acid and/or an organic acid;
[3] a polishing process comprising applying the polishing composition of item [1] or [2] above;
[4] a process for manufacturing a magnetic disk substrate, comprising the step of polishing a substrate with the polishing composition of item [1] or [2] above; and
[5] a magnetic disk substrate manufactured by applying the polishing composition of item [1] or [2] above.

DETAILED DESCRIPTION OF THE INVENTION

In the present invention, a metal salt of a polyaminocarboxylic acid (Fe salt and/or Al salt) is used, from the viewpoints of improving the surface smoothness such as surface roughness (Ra) and waviness (Wa), and increasing the polishing rate. The polyaminocarboxylic acid moiety of the metal salt of a polyaminocarboxylic acid has a multidentate ligand for forming a chelate compound by binding with a metal ion, and has two or more carboxyl groups. The molecular weight of the polyaminocarboxylic acid is preferably from 80 to 1000, more preferably from 140 to 600, from the viewpoints of increasing the polishing rate, suppressing precipitation of metal ions, and improving the solubility. In addition, the number of carboxyl groups of the polyaminocarboxylic acid is preferably 3 or more, from the viewpoint of increasing the polishing rate, and that the number of carboxyl groups is preferably 10 or less, more preferably 8 or less, more preferably 6 or less, from the viewpoint of improving the solubility. Concrete examples of the polyaminocarboxylic acid include ethylenediaminetetraacetic acid, hydroxyethylenediaminetetraacetic acid, nitrilotriacetic acid, diethylenettiaminepentaacetic acid, triethylenetetraminehexaacetic acid, 4 dicarboxymethyl glutamic acid, hydroxyethylimino diacetic acid, dihydroxyethyl glycine, 1,3-propanediamine tetraacetic acid, 1,3-diamino-2-hydroxypropane tetraacetic acid, and the like. Among them, ethylenediaminetetraacetic acid, nitrilotriacetic acid, diethylenetiiaminepentaacetic acid, dicarboxymethyl glutamic acid and 1,3-propanediamine tetraacetic acid are preferable, and ethylenediaminetetraacetic acid is especially preferable.

In addition, as the metal ions usable for the metal salt of a polyaminocarboxylic acid, Fe ions and Al ions are preferable, from the viewpoints of increasing the polishing rate of the polishing composition and preventing the reduction of dispersibility of the silica abrasive grains. Fe ions are more preferable, and Fe ions with a valence number of 3 are especially preferable. In addition, the metal salt may be those containing ammonium ions or sodium ions, from the viewpoint of improving the solubility. In the present specification, the Fe salt of a polyaminocarboxylic acid refers to any salts containing iron atom, encompassing not only iron salts but also iron sodium salts and iron ammonium salts. The same can be said for the Al salt, and it encompasses not only aluminum salts but also aluminum sodium salts and aluminum ammonium salts.

Preferred examples of the metal salt of a polyaminocarboxylic acid include iron ethylenediaminetetraacetate, aluminum ethylenediaminetetraacetate, aluminum ammonium ethylenediaminetetraacetate, iron diethylenetriaminepentaacetate, iron 1,3-propanediamine tetraacetate, aluminum diethylenetriaminepentaacetate, aluminum 1,3-propanediamine tetraacetate, iron ammonium ethylenediaminetetraacetate, iron sodium ethylenediaminetetraacetate, iron ammonium 1,3-propanediamine tetraacetate, iron ammonium diethylenetriaminepentaacetate, iron sodium diethylenetiaminepentaacetate, and the like. In addition, these polyaminocarboxylates can be previously formed into a necessary metal salt, or a desired salt can be obtained by mixing an inorganic acid salt such as nitrate, sulfate or phosphate, or an organic acid salt such as acetate, each inorganic salt or organic salt containing these metals, with a polyaminocarboxylic acid and/or a polyaminocarboxylate of other than an Fe salt and an Al salt to carry out chelate exchange in the polishing composition.

The content of the metal salt of a polyaminocarboxylic acid is preferably 0.02% by weight or more, more preferably 0.05% by weight or more, still more preferably 0.1% by weight or more, especially preferably 0.5% by weight or more, of the polishing composition, from the viewpoint of increasing the polishing rate, and the content of the metal salt is preferably 20% by weight or less, more preferably 15% by weight or less, still more preferably 10% by weight or less, especially preferably 5% by weight or less, of the polishing composition, from the viewpoints of reducing the surface roughness and waviness, and reducing the surface defects such as pits and scratches, thereby improving the surface quality. The content is preferably from 0.02 to 20% by weight, more preferably from 0.05 to 15% by weight, still more preferably from 0.1 to 10% by weight, especially preferably from 0.5 to 5% by weight.

In the present invention, silica particles are used, from the viewpoints of reducing the surface roughness (Ra) and the waviness (Wa), and reducing the surface defects such as scratches, thereby improving the surface quality. The silica particles include colloidal silica particles, fumed silica particles, surface-modified silica particles, and the like, and the colloidal silica particles are preferable. Here, the colloidal silica particles can be obtained by, for instance, a process comprising forming from an aqueous silicic acid.

The average primary particle size of the silica particles is preferably 0.001 μm or more, more preferably 0.01 μm or more, still more preferably 0.02 μm or more, from the viewpoint of increasing the polishing rate, and the average primary particle size is preferably 0.6 μm or less, more preferably 0.5 μm or less, still more preferably 0.3 μm or less, still more preferably 0.2 μm or less, from the viewpoint of reducing the surface roughness (Ra) and the waviness (Wa). The average primary particle size is preferably 0.001 to 0.6 μm, more preferably from 0.001 to 0.5 μm, still more preferably from 0.01 to 0.3 μm, especially preferably from 0.02 to 0.2 μm. Here, the particle size can be determined by carrying out image analysis by observation with a scanning electron microscope (magnification: preferably from 3000 to 100000 times) to determine an arithmetic means of width and length of particle.

Further, as the particle size distribution of the silica particles, those exemplified below are preferable.
(1) a ratio of $D90/D50$ is from 1.3 to 3.0, and D50 is from 10 to 600 nm, wherein D90 is defined as a particle size at 90% counted from a smaller size side on a number base in a cumulative particle size distribution, and wherein D50 is defined as a particle size at 50% counted from a smaller size side on a number base in a cumulative particle size distribution.

In the present invention, by using the polishing composition comprising silica particles having a particle size distribution shown in item (1) above, there are exhibited such effects that the surface roughness of the substrate to be polished is made small after polishing, and that the substrate to be polished can be polished at an economical speed without generating surface defects such as projections and polishing damages.

In the particle size distribution shown in item (1) above, $D90/D50$ is preferably from 1.3 to 3.0, more preferably from 1.3 to 2.0, from the viewpoints of preventing the generation of scratches, reducing the surface roughness (Ra), thereby accomplishing smoother and excellent suiface quality, and accomplishing a high polishing rate. In addition, $D90/D50$ is preferably 1.3 or more, from the viewpoint of accomplishing a high polishing rate, and $D90/D50$ is preferably 3.0 or less, from the viewpoints of maintaining a high polishing rate and obtaining excellent surface smoothness.

In the particle size distribution shown in item (1) above, D50 is from 10 to 600 nm, preferably from 30 to 200 nm, especially preferably from 40 to 100 nm. D50 is preferably 10 nm or more, from the viewpoint of increasing a high polishing rate, and D50 is preferably 600 nm or less, from the viewpoints of preventing the generation of surface defects such as scratches and obtaining excellent surface smoothness.

In addition, in the silica particles having the particle size distribution shown in item (1) above, in order to obtain a substrate to be polished at a high polishing rate and have excellent surface smoothness, it is preferable that D10 is preferably from 5 to 100 nm, more preferably from 15 to 85 mn, still more preferably from 35 to 70 nm, especially preferably from 40 to 60 nm, wherein D10 is defined as a particle size at 10% counted from a smaller size side on a number base in a cumulative particle size distribution. D10 is preferably 5 nM or more, from the viewpoint of increasing a high polishing rate, and D10 is preferably 100 nm or less, from the viewpoint of maintaining excellent surface smoothness.

Incidentally, the particle size distribution shown in item (1) above is a particle size distribution of overall silica particles. For instance, as the silica particles having the particle size distribution shown in item (1) above, two or more types of silica particles may be used in combination. In this case, each of the particle size distributions mentioned above (D10, D50, D90) is determined for the admixed silica particles.

Among them, when the silica particles comprise two or more types of silica particles of which D50s are different from each other, those having the following particle size distribution are preferable.
(2) a ratio of D50L to D50S (D50L/D50S) is from 1.1 to 4.0, and a weight ratio of A to B (A/B) is from 90/10 to 10/90, wherein D50 is defined as a particle size at 50% counted from a smaller size side on a number base in a cumulative particle size distribution, wherein D50L is defined as the largest D50 owned by silica particles (B) and D50S is defined as the smallest D50 owned by silica particles (A).

One of the great features of the present invention resides in that the silica particles comprise two or more types of silica particles of which D50s are different from each other, each of the silica particles having the particle size distribution as shown in item (2) above. By using a polishing composition comprising the silica particles, there are advantages that the surface roughness of the substrate to be polished is small after polishing, and polishing of the substrate to be polished can be carried out without generating surface defects such as projections and polishing damages, whereby especially an excellent polishing rate is obtained. Here, when three or more types of silica particles of which D50s are different from each other, D50 of the silica particles having the smallest D50 is referred to as "D50S," and D50 of the silica particles having the largest D50 is referred to as "D50L."

In the particle size distribution as shown in item (2) above, D50L/D50S is preferably from 1.1 to 4.0, more preferably from 1.1 to 3.0, still more preferably from 1.5 to 3.0. D50L/D50S is preferably 1.1 or more, from the viewpoint of increasing the polishing rate, and D50L/D50S is preferably 4.0 or less, from the viewpoints of maintaining a high polishing rate, and maintaining excellent surface smoothness, without generating surface defects such as scratches. In the particle size distribution as shown in item (2) above, it is preferable that the mixing ratio of two or more types of the silica particles is such that the ratio of D90 to D50 in the particle size distribution of the particles after mixing satisfies from 1.3 to 3.0, and that D50 is from 10 to 600 nm. Further, it is preferable that D10 is from 5 to 100 nm. Incidentally, the mixing weight ratio of A to B (A/B) is preferably from 90/10 to 10/90, more preferably from 90/10 to 20/80, still more preferably from 85/15 to 35/65, wherein A is defined as silica particles having the smallest D50 and B is defined as silica particles having the largest D50.

In the silica particles having the particle size distribution as shown in item (2) above, so long as the silica particles used have two or more types of D50s which are different from each other, the kinds of the individual silica particles may be identical or different. Here, D50L and D50S mentioned above are each determined prior to mixing.

Further, it is preferable that the silica particles have a particle size distribution shown below:

(3) a percentage at 40 nm counted from a smaller size side on a number base in a cumulative particle size distribution is 25% or less, and wherein D50 is from 50 to 600 nm.

One of the great features of the present invention resides in that the silica particles have a particle size distribution as shown in item (3) above. By using a polishing composition comprising the silica particles, there is exhibited such an effect that the silica particles can be readily cleaned from the surface of the substrate to be polished by ordinary cleaning.

In the particle size distribution as shown in item (3) above, it is desired that the percentage at 40 nm counted from a smaller size side on a number base in a cumulative particle size distribution is 25% or less, preferably 15% or less, more preferably 10% or less, still more preferably 5% or less, especially preferably 3% or less, from the viewpoint of reducing the amount of the silicate particles remaining on the substrate to be polished. In order to adjust the percentage at 40 nm counted from a smaller particle size side on a number base in a cumulative particle size distribution to 25% or less, for instance, the content of the silica particles having a particle size of 40 nm or less may be made low. As a method for lowering the content of the silica particles of which particle size is 40 nm or less, a colloidal silica having a low content of particles having a small particle size can be prepared by controlling the addition rate of an active sol during the synthesis of colloidal silica in which silica sol is allowed to grow as a core. In addition, there would be no problem to classify a colloidal silica having a low content of particles having a small particle size with a centrifuge or the like.

On the other hand, D50 is preferably from 50 to 600 nm, more preferably from 50 to 200 nm, still more preferably from 50 to 150 nm, from the viewpoints of accomplishing economic polishing rate, and accomplishing excellent surface quality having excellent surface smoothness without surface defects.

In addition, it is preferable that the ratio of D90 to D50 (D90/D50) is from 1.3 to 3.0, more preferably from 1.3 to 2.0, from the viewpoints of accomplishing a high polishing rate, and accomplishing excellent surface quality having excellent surface smoothness without surface defects.

As the silica particles having the particle size distribution shown in item (3) above, two or more types of silica particles may be used in combination. In this case, each of the particle size distributions mentioned above is determined for the admixed silica particles.

In addition, it is preferable that the silica particles used in the present invention are those satisfying two or more conditions selected from items (1) to (3) above, and especially it is more preferable that all these conditions are satisfied.

The particle size of the silica particles in any of items (1) to (3) above can be determined by the following method using a scanning electron microscope (hereinafter simply referred to as SEM). Specifically, a polishing composition comprising silica particles is diluted so that the silica particle concentration is 0.5% by weight. The diluted suspension is evenly applied to a sample plate for SEM heated to about 50° C. Thereafter, excess suspension is wiped off by a filter paper, and the coat is evenly air-dried so that the suspension is not aggregated.

Pt—Pd is deposited on the air-dried silica particles. Using an electric field effect scanning electron microscope (FE-SEM: Model S-4000) manufactured by Hitachi LTD., of which magnification is adjusted to 3000 to 100000 times so that about 500 silica particles can be observed within the scope, two pinpoints per one sample plate are observed and a microphotograph is taken thereat. Each microphotograph taken (4 inches×5 inches) is enlarged to an A4 size (210 mm×297 mm) by a copy machine or the like, and the particle sizes of all the photographed silica particles are determined by calipers or the like and the data are summed up. The procedures are repeated for several runs, so that the number of silica particles to be determined is 2000 or more. It is more preferable that the number of determination points by SEM is increased, from the viewpoint of obtaining an accurate particle size distribution. The particle size distribution on a number base in the present invention can be obtained by summing up data for the determined particle sizes and adding its frequency (%) from a smaller particle size, with defining a particle size at 10% cumulative frequency as D10, a particle size at 50% cumulative frequency as D50, and a particle size at 90% cumulative frequency as D90. The particle size distribution as referred to herein is obtained as the particle size distribution of the primary particle, with proviso that when secondary particles in which primary particles of aluminum oxide, cerium oxide, fumed silica or the like are fused to each other are present, the particle size distribution can be obtained on the basis of the particle size of the secondary particle size thereof.

In addition, the method for adjusting the particle size distribution of the silica particles is not particularly limited. In the case where the silica particles are colloidal silica, the adjustment for the particle size distribution can be accomplished by, for instance, a method comprising adding a new particle acting as a core in the growth process of the particle during the preparation stage, to give a final product allowed to have a particle size distribution; a method of mixing two or more types of silica particles of which particle size distributions are different from each other; and the like.

The content of the silica particles is preferably 0.5% by weight or more, more preferably 1% by weight or more, still more preferably 3% by weight or more, especially preferably 5% by weight or more, of the polishing composition, from the viewpoint of increasing the polishing rate, and the content of the silica particles is preferably 50% by weight or less, more preferably 40% by weight or less, still more preferably 30% by weight or less, especially preferably 25% by weight or less, of the polishing composition, from the viewpoints of improving the surface quality and economic advantages. The content is preferably from 0.5 to 50% by weight, more preferably from 1 to 40% by weight, still more preferably from 3 to 30% by weight, especially preferably from 5 to 25% by weight.

It is preferable that the polishing composition of the present invention further comprises an inorganic acid and/or an organic acid, from the viewpoint of increasing the polishing rate.

The inorganic acid includes hydrochloric acid, sulfuric acid, nitric acid, phosphoric acid, and the like.

The molecular weight of the organic acid is preferably from 40 to 10000, more preferably from 40 to 5000, still more preferably from 40 to 1000, especially preferably from 40 to 500, from the viewpoint of its solubility to water. The organic acid includes carboxylic acid-based organic acids, phenol-based organic acids, sulfonic acid-based organic acids, phosphoric acid-based organic acids, and the like. The carboxylic acid-based organic acid includes monocarboxylic acids such as formic acid and acetic acid; dicarboxylic acids such as oxalic acid, malonic acid, succinic acid, glutaric acid, adipic acid, maleic acid, fumaric acid, itaconic acid and diglycolic acid; hydroxycarboxylic acids such as glycolic acid, malic acid, citric acid, tartaric acid and gluconic acid. The phenol-based organic acid includes phenol, and the like. The sulfonic acid-based organic acid includes methanesulfonic acid, sulfosalicylic acid, tiron, and the like. The phosphoric acid-based organic acid includes adenosine phosphate, guanosine triphosphate, cytidine phosphate, and the like. From the viewpoint of increasing the speed, the organic acid is more preferable, and the carboxylic acid is still more preferable, the hydroxycarboxylic acid is especially preferable, and glycolic acid is most preferable.

The content of the inorganic acid and/or organic acid is preferably 0.02% by weight or more, more preferably 0.05% by weight or more, still more preferably 0.1% by weight or more, especially preferably 0.5% by weight or more, of the polishing composition, from the viewpoint of increasing the polishing rate. The content of the inorganic acid and/or organic acid is preferably 20% by weight or less, more preferably 15% by weight or less, still more preferably 10% by weight or less, especially preferably 5% by weight or less, of the polishing composition, from the viewpoints of reducing surface roughness and waviness and reducing surface defects such as pits and scratches, thereby improving the surface quality, and giving economic advantages. The content is preferably from 0.02 to 20% by weight, more preferably from 0.05 to 15% by weight, still more preferably from 0.1 to 10% by weight, especially preferably from 0.5 to 5% by weight.

Water in the polishing composition of the present invention is used as a medium. From the viewpoint of efficiently polishing the substrate to be polished, the water content is preferably 50% by weight or more, more preferably 60% by weight or more, still more preferably 70% by weight or more, especially preferably 80% by weight or more, of the polishing composition, and the water content is preferably 99.46% by weight or less, more preferably 99% by weight or less, still more preferably 98.5% by weight or less, especially preferably 98% by weight or less, of the polishing composition. The water content is preferably from 50 to 99.46% by weight, more preferably from 60 to 99% by weight, still more preferably from 70 to 98.5% by weight, especially preferably from 80 to 98% by weight.

The concentration of each component of the above-mentioned polishing composition may be any of the concentration during the preparation of the composition and the concentration upon use. In many cases, the composition is usually prepared as a concentrate, which is diluted upon use.

In addition, there can be added other component to the polishing composition of the present invention as occasion demands. The other component includes metal salts or ammonium salts of a monomeric form of acid compounds, peroxides, thickeners, dispersing agents, anticorrosive agents, basic substances, surfactants, and the like. Concrete examples of the metal salts or ammonium salts of a monomeric form of acid compounds, and peroxides are those listed in Japanese Patent Laid-Open No. Sho 62-25187, page 2, upper right column, lines 3 to 11; Japanese Patent Laid-Open No. Sho 63-251163, page 3, upper left column, lines 4 to 8; Japanese Patent Laid-Open No. Heli 1-205973, page 3, upper left column, line 4 to upper right column, line 2; Japanese Patent Laid-Open No. Hei 3-115383, page 2, lower right column, line 16 to page 3, lower left column, line 11; Japanese Patent Laid-Open No. Hei 4-275387, page 2, right column, line 27 to page 3, left column, line 12 and lines 17 to 23; and the like.

The polishing composition of the present invention can be prepared by mixing the above-mentioned silica particles, an Fe salt and/or an Al salt of a polyaminocarboxylic acid, and water, and further adding, as occasion demands, an inorganic acid and/or organic acid thereto by a known method.

The pH of the polishing composition of the present invention is preferably from 2 to 12, more preferably from 3 to 10, from the viewpoints of corrosiveness of working machines and safety of the workers. In addition, although the pH of the polishing composition cannot be absolutely determined because it differs depending upon the materials of the substrate to be polished, it is desirable that the pH is 6.5 or less, preferably less than 6.0, more preferably 5.9 or less, still more preferably 5.5 or less, still more preferably 5 or less, still more preferably 4 or less, from the viewpoint of increasing the polishing rate, and that the pH is 7.5 or more, preferably 8 or more, more preferably 9 or more, from the viewpoint of increasing the polishing rate. Especially in the substrate for precision parts mainly made of a metal such as an aluminum alloy substrate produced by Ni—P plating, it is preferable that the pH shows acidic, i.e. 6.5 or less, preferably less than 6.0, more preferably 5.9 or less, still more preferably 5.5 or less, still more preferably 5 or less, still more preferably 4 or less, from the viewpoint of increasing the polishing rate. In addition, the pH shows basic, i.e. 7.5 or more, preferably 8 or more, more preferably 9 or more, from the viewpoints of improving the dispersibility of the silica particles, thereby improving the surface quality. In addition, the pH is preferably neutral, from the viewpoint of reducing the abrasive grain residue in the cleaning after polishing. Therefore, although the pH may be set in accordance with the purpose which is to be considered important, especially in the substrate for precision parts mainly made of a metal such as an aluminum alloy substrate produced by Ni—P plating, the pH is preferably from 2 to 7, more preferably from 2.5 to 6.5, still more preferably from 2.5 to 5.9, still more preferably from 2.5 to 5.5, still more preferably from 3 to 5.5, from the total viewpoints mentioned above. The pH can be adjusted by properly adding an inorganic acid such as nitric acid or sulfuric acid, the metal salt or ammonium salt of the monomeric form of an acid compound, the peroxide, a basic substance such as an aqueous ammonia, potassium hydroxide, sodium hydroxide or an amine in a desired amount.

The material for the substrate to be polished by the polishing composition of the present invention includes, for instance, metals or metalloids such as silicon, aluminum, tungsten, copper, tantalum and titanium; glassy substances such as glass, glassy carbon and amorphous carbons; ceramic materials such as alumina, silicon dioxide, silicon nitride, tantalum nitride, titanium nitride and titanium carbide; resins such as polyimide resins; and the like. Among them, a substrate to be polished is preferably made of a metal such as aluminum, tungsten or copper, or made of an alloy containing these metals as the main components; or a substrate to be polished preferably contains these metals as in semiconductive substrates made of semiconductive elements. For instance, an aluminum alloy substrate plated with Ni—P or a glass substrate such as crystallized glass or reinforced glass is more preferable, and the aluminum alloy substrate plated with Ni—P is especially preferable.

The shape for the substrate to be polished is not particularly limited. For instance, those having shapes containing planar portions such as discs, plates, slabs and prisms, or shapes containing curved portions such as lenses can be subjects for polishing with the polishing composition of the present invention. Among them, those having the disc-shaped substrates are especially preferable in polishing.

The polishing composition of the present invention can be favorably used in polishing the substrate for precision parts. For instance, the polishing composition is suitable for polishing substrates for precision parts such as substrates for magnetic recording media for magnetic discs, optical discs, opto-magnetic discs, and the like; photomask substrates, optical lenses, optical mirrors, optical prisms and semiconductive substrates. The polishing of the semiconductive substrates comprises the steps of polishing a silicon wafer (bare wafer), forming separation membrane for an embedding element, flattening an interlayer dielectric film, forming an embedded line, and forming embedded capacitor, and the like. The polishing composition of the present invention is especially suitable for polishing a magnetic disc substrate. Further, the polishing composition is suitable for obtaining a magnetic disc substrate having a surface roughness (Ra) of 3 Å or less and a waviness (Wa) of 3 Å or less. In the present specification, the surface roughness (Ra) and the waviness (Wa) are determined as so-called average deviation, of all points from a plane fit to the test part surface. The average deviation, of all points from a plane fit to the test part surface obtained from a roughness curve having a wave length component of 80 $\mu$m or less is expressed as Ra, and the average deviation, of all points from a plane fit to the test part surface obtained from a waviness curve having a wave length component of 0.4 to 5 mm is expressed as Wa. Wa is an average deviation, of all points from a plane fit to the microwaviness data. These Ra and Wa can be determined as follows:

[Average Deviation, of All Points from Plane Fit to Test Part Surface (Ra)]

Determined under the following conditions using Talystep manufactured by Rank Taylor-Hobson Limited.

| | |
|---|---|
| Size of Tip End of Profilometer: | 2.5 $\mu$m × 2.5 $\mu$m |
| By-pass Filter: | 80 $\mu$m |
| Measurement Length: | 0.64 mm |

[Average Deviation, of All Points from Plane Fit to Microwaviness Data (Wa)]

Determined under the following conditions using New View 200CHR manufactured by Zygo.

| | |
|---|---|
| Object Lens: | Magnification, 2.5 times |
| Image Zoom: | Magnification, 0.5 times |
| Filter: | Band Pass |
| Filter type: | FFT Fixed |
| Filter High Wavelength: | 0.4 mm |
| Filter Low Wavelength: | 5.0 mm |
| Remove: | Cylinder |

The polishing process using the polishing composition of the present invention includes, for instance, a polishing process comprising clamping a substrate with polishing discs to which a polishing cloth made of nonwoven organic polymer fabric, is pasted; feeding a polishing composition to a polishing surface; and moving the polishing discs or the substrate, with applying a given pressure. In the polishing process of the present invention, by using the polishing composition of the present invention, there can be exhibited such effects that the polishing rate is increased, that the generation of surface defects such as scratches and pits is suppressed, and that the surface smoothness such as surface roughness (Ra) and waviness (Wa) can be improved.

The method for producing a magnetic disc substrate of the present invention includes the polishing process using the above-mentioned polishing composition. In the method, it is preferable that the polishing process of the present invention is carried out in a second step or a subsequent steps among the plural polishing steps, and it is especially preferable that the polishing process of the present invention is carried out in the final polishing step. For instance, the aluminum alloy substrate which is Ni—P plated to have a surface roughness (Ra) of 5 Å to 15 Å and a waviness (Wa) of 5 to 10 Å obtained in a single-step or two-step polishing process is polished by the polishing step using the polishing composition of the present invention, whereby a magnetic disk substrate having a surface roughness (Ra) of 3 Å or less and a waviness (Wa) of 3 Å or less, preferably a magnetic disk substrate having a surface roughness (Ra) of 2.5 Å or less and a waviness (Wa) of 2.5 Å or less, can be produced. Especially, the polishing composition of the present invention is suitably used for the second step in the two-step polishing process during the production of the magnetic disk substrate having a surface roughness (Ra) of 3 Å or less and a waviness (Wa) of 3 Å or less, preferably a magnetic disk substrate having a surface roughness (Ra) of 2.5 Å or less and a waviness (Wa) of 2.5 Å or less.

The magnetic disk substrate thus produced is excellent in the surface smoothness. As the surface smoothness, it is desired that the surface smoothness (Ra) is 3 Å or less, preferably 2.5 Å or less. In addition, it is desired that the waviness (Wa) is 3 Å or less, preferably 2.5 Å or less.

By using the polishing composition of the present invention as mentioned above, the polishing rate can be increased, and there can be efficiently produced a high-quality magnetic disk substrate having excellent surface properties such that there are little surface defects such as scratches and pits, and the surface smoothness such as surface roughness (Ra) and waviness (Wa), is improved. Especially, the polishing rate can be improved, and at the same time there can be efficiently produced a high-quality magnetic disk substrate having excellent surface property such that the surface smoothness such as waviness (Wa) is improved.

EXAMPLES

Examples 1 to 6, and Comparative Examples 1 to 12

There were mixed and stirred together 62.5 parts by weight of SNOWTEX ZL commercially available from Nissan Chemical Industries, Ltd. (average particle size: 0.08 to 0.1 $\mu$m, silica concentration: 40% by weight) as silica particles; the amount in parts by weight shown in Table 1 of the compound listed in Table 1; and balance ion-exchanged water, and the pH of the resulting mixture was adjusted with nitric acid or an aqueous ammonia, to give each of 100 parts by weight of the polishing compositions of Examples 1 to 5 and Comparative Examples 1 to 12. In addition, the polishing composition of Example 6 was prepared in the same manner as in Example 1 except that 62.5 parts by weight of the above-mentioned silica particles, 3.0 parts by weight of iron ethylenediaminetetraacetate, 2.0 parts by weight of glycolic acid, and balance ion-exchanged water were mixed and stirred together. Using each polishing composition, the surface of the Ni—P plated, aluminum alloy substrate had a surface roughness of 15 Å, a waviness of 8 Å, a thickness of 0.8 mm, and a diameter of 3.5 inches was polished by using a double-sided processing machine under Set Conditions 1 for Double-Sided Processing Machine given below, to give a polished Ni—P plated, aluminum alloy substrate usable for a magnetic disk substrate.

Set Conditions 1 for Double-Sided Processing Machine

Double-sided processing machine: double-sided processing machine, Model 9B, manufactured by SPEEDFAM CO., LTD.
Processing pressure: 7.8 kPa
Polishing Pad: "POLYTEX DG" (manufactured by Rodel Nitta K.K.).
Disc rotational speed: 5 r/min
Feeding flow rate for a polishing composition: 20 ml/min
Polishing time period: 5 minutes
Number of substrate introduced: 10

The weight of the aluminum alloy substrate after polishing was determined, and a rate of weight loss was calculated from the change in the weights of the aluminum alloy substrate before and after polishing, and a relative polishing rate (relative value) was calculated based on the value in Comparative Example 1 as a standard. In addition, the surface roughness and the waviness of each of the resulting aluminum alloy substrate were determined by the methods described above, and evaluated as ○: a value of 3 Å or less; and x: a value of exceeding 3 Å. The results are shown in Table 1.

TABLE 1

| | Metal Salt of Polyaminocarboxylic Acid or Other Metal Salt | Amount (parts by weight) | pH | Relative Polishing Rate | Surface Roughness (Ra) | Waviness (Wa) |
|---|---|---|---|---|---|---|
| Ex. 1 | Iron ethylenediaminetetraacetate | 3.0 | 6.5 | 1.4 | ○ | ○ |
| Ex. 2 | Iron ethylenediaminetetraacetate | 3.0 | 3.8 | 1.6 | ○ | ○ |
| Ex. 3 | Iron diethylenetriaminepentaacetate | 3.0 | 3.0 | 1.3 | ○ | ○ |
| Ex. 4 | Iron 1,3-propanediaminetetraacetate | 3.0 | 5.4 | 1.3 | ○ | ○ |
| Ex. 5 | Aluminum ammonium ethylenediaminetetraacetate | 3.0 | 6.2 | 1.2 | ○ | ○ |
| Ex. 6 | Iron ethylenediaminetetraacetate | 3.0 | 3.0 | 1.8 | ○ | ○ |
| Comp. Ex. 1 | None | — | 7.0 | 1.0 | ○ | x |
| Comp. Ex. 2 | Iron citrate | 3.0 | 6.3 | 0.7 | ○ | x |
| Comp. Ex. 3 | Iron ammonium citrate | 3.0 | 8.5 | 0.2 | x | x |
| Comp. Ex. 4 | Iron nitrate | 3.0 | 2.7 | 0.4 | x | x |
| Comp. Ex. 5 | Aluminum nitrate | 3.0 | 4.7 | 0.9 | ○ | x |
| Comp. Ex. 6 | Iron sulfate | 3.0 | 2.7 | 1.0 | ○ | x |
| Comp. Ex. 7 | Sodium ethylenediaminetetraacetate | 3.0 | 6.1 | 0.8 | ○ | x |
| Comp. Ex. 8 | Sodium ethylenediaminetetraacetate | 3.0 | 4.3 | 1.0 | ○ | x |
| Comp. Ex. 9 | Ammonium ethylenediaminetetraacetate | 3.0 | 6.0 | 0.7 | ○ | x |
| Comp. Ex. 10 | Ammonium ethylenediaminetetraacetate | 3.0 | 4.3 | 0.7 | ○ | x |
| Comp. Ex. 11 | Magnesium ethylenediaminetetraacetate | 3.0 | 7.2 | 1.0 | ○ | x |
| Comp. Ex. 12 | Magnesium ethylenediaminetetraacetate | 3.0 | 4.0 | 1.0 | ○ | x |

It is clear from the results shown in Table 1 that the polishing compositions of Examples 1 to 6 where the Fe salt or Al salt of a polyaminocarboxylic acid is used have higher polishing rate and that their surface roughness and waviness can be reduced, as compared with those where Fe salts and Al salts of other acids (Comparative Examples 2 to 6) were used, or where salts other than Fe and Al of the polyaminocarboxylic acid (Comparative Examples 7 to 12) were used.

EXAMPLE 7

An Ni—P plated, aluminum alloy substrate, having a surface roughness of 180 Å, a waviness of 22 Å, a thickness of 0.8 mm, and a diameter of 3.5 inches was polished by using a double-sided processing machine under the Set Conditions 2 for Double-Sided Processing Machine given below using an alumina-based polishing composition given below, to give an aluminum alloy substrate having a surface roughness of 13 Å and a waviness of 6 Å.

Next, the resulting substrate was polished by using a double-sided processing machine under the above-mentioned Set Conditions 1 for Double-Sided Processing Machine using the polishing composition of Example 1, to give a polished Ni—P plated, aluminum alloy substrate usable for a magnetic disk substrate.

The surface roughness, the waviness, and the scratches of the substrate after polishing were determined. As a result, the surface roughness was found to be 2.5 Å or less, and the waviness 2.5 Å or less, and no scratches with depth exceeding 50 nm were observed and no pits were observed. Incidentally, the scratches and pits were determined by the methods given below.

As mentioned above, by using the polishing composition of the present invention, there could be produced a magnetic disc substrate substantially having no surface defects as scratches and pits, and having an excellent surface smoothness with a surface roughness (Ra) of 3 Å or less and waviness (Wa) of 3 Å or less.

Alumina-Based Polishing Composition

A polishing composition composed of 8 parts by weight of α-alumina (purity: about 99.9%, specific gravity: 4.0) having an average primary particle size of 0.25 μm and an average secondary particle size of 0.7 μm; 2 parts by weight of γ-alumina having an average particle size of 0.7 μm, a specific surface area of 130 m²/g, a content of an alkali metal of 0.0055% by weight, and a content of an alkaline earth metal of 0.0013% by weight; 0.8 parts by weight of aluminum ammonium ethylenediaminetetraacetate, and 89.2 parts by weight of ion-exchanged water.

Set Conditions 2 for Double-Sided Processing Machine

Double-sided processing machine: double-sided processing machine, Model 9B, manufactured by SPEEDFAM CO., LTD.

Processing pressure: 9.8 kPa
Polishing Pad: "POLYTEX DG" (manufactured by Rodel Nitta K.K.).
Disc rotational speed: 50 r/min
Feeding flow rate for a polishing composition: 100 ml/min
Polishing time period: 5 minutes
Number of substrate introduced: 10
Evaluation of Scratches Each of the substrate surface was observed with an optical microscope (differential interference microscope) with a magnification of 50 times at 6 locations at 60-degree intervals. The depth of the scratches was determined by an atomic force microscope (AFM; commercially available from Digital Instruments, "Nanoscope III").
Evaluation of Pits Each of the substrate surface was observed with an optical microscope (differential interference microscope) with a magnification of 200 times at 12 locations at 30-degree intervals. The number of pits per 12 scopes was counted.

EXAMPLES 8 TO 10 AND COMPARATIVE EXAMPLE 13

As silica particles, there was used colloidal silica [indicated in Tables 2 and 3 as Abrasive Materials A to D] having the properties as shown in Table 2 such that the cumulative particle sizes (D10, D50, D90) were obtained by using a scanning electron microscope (commercially available from Hitachi, LTD., Model S-4000) in accordance with the method described under the section of DETAILED DESCRIPTION OF THE INVENTION in the present invention (the particle size being determined by calipers). There were stirred and mixed 25 parts by weight of the silica particles, the compound of Table 4 of which amounts are shown in Table 4, and balance ion-exchanged water, and the pH of the resulting mixture was adjusted with nitric acid or an aqueous ammonium, to give 100 parts by weight of each of the polishing compositions of Examples 8 to 10 and Comparative Example 13. An Ni—P plated aluminum alloy substrate was polished in the same manner as in Example 1 using each of the resulting polishing compositions, to give a polished Ni—P plated, aluminum alloy substrate usable for a magnetic disk substrate. The relative polishing rate and the surface roughness and the waviness of the resulting aluminum alloy substrate were determined in the same manner as in Example 1, and evaluated as ○: a value of 3 Å or less; and x: a value of exceeding 3 Å. Also, the silica particles remaining on the substrate to be polished were evaluated in accordance with the following method. The results are shown in Table 4.

Evaluation on Silica Particles Remaining on the Substrate to Be Polished

The silica particles remaining on the substrate to be polished were detected at 3 locations each on front and back sides of the substrate to be polished, each within a scope of 10 $\mu$m×10 $\mu$m, by using an atomic force microscope (AFM; commercially available from Digital Instruments, "Nanoscope III") at a scan rate of 1 Hz, to confirm the presence or absence of the remained silica particles (residual abrasive grains) by the following criteria.

Evaluation Criteria:

○: the average number of the remained silica particles is 5 or less within a scope of 10 $\mu$m×10 $\mu$m x: the average number of the remained silica particles is exceeding 5 within a scope of 10 $\mu$m×10 $\mu$m

TABLE 2

|  | Abrasive Material A | Abrasive Material B | Abrasive Material C | Abrasive Material D |
|---|---|---|---|---|
| D10 (nm) | 43 | 67 | 135 | 31 |
| D50 (nm) | 55 | 105 | 165 | 43 |
| D90 (nm) | 62 | 116 | 180 | 51 |

TABLE 3

| | Kinds of Silica Particles (Parts by Weight) | | | | Properties of Silica Particles | | | | | | | Cumulative Particle Size Distribution at 40 nm (%) |
|---|---|---|---|---|---|---|---|---|---|---|---|---|
| Example No. | Abrasive Material A | Abrasive Material B | Abrasive Material C | Abrasive Material D | D50S (nm) | D50L (nm) | D50L/ D50S | D10 (nm) | D50 (nm) | D90 (nm) | D90/ D50 | |
| Example 8 | 16.2 | 6.3 | 2.5 | — | 55 | 165 | 3.00 | 45 | 58 | 90 | 1.55 | 3.0 |
| Example 9 | 16.2 | 6.3 | 2.5 | — | 55 | 165 | 3.00 | 45 | 58 | 90 | 1.55 | 3.0 |
| Example 10 | 15.0 | 10.0 | — | — | 55 | 105 | 1.91 | 45 | 61 | 95 | 1.56 | 2.7 |
| Comparative Example 13 | — | — | — | 25.0 | — | — | — | 31 | 43 | 51 | 1.19 | 34.6 |

TABLE 4

| | Metal Salt or Other Metal Salt of Polyaminocarboxylic Acid | | Inorganic Acid and/ or Organic Acid | | | | | | |
|---|---|---|---|---|---|---|---|---|---|
| Example No. | Kind | Amount (Parts by Weight) | Kind | Amount (Parts by Weight) | pH | Relative Polishing Rate | Surface Roughness (Ra) | Waviness (Wa) | Residual Abrasive Grains |
| Example 8 | Iron ethylene-diaminetetraacetate | 3.0 | — | — | 3.8 | 2.1 | ○ | ○ | ○ |
| Example 9 | Iron ethylene-diaminetetraacetate | 3.0 | Glycolic acid | 2.0 | 3.0 | 2.5 | ○ | ○ | ○ |

TABLE 4-continued

| Example No. | Metal Salt or Other Metal Salt of Polyaminocarboxylic Acid | | Inorganic Acid and/ or Organic Acid | | pH | Relative Polishing Rate | Surface Roughness (Ra) | Waviness (Wa) | Residual Abrasive Grains |
|---|---|---|---|---|---|---|---|---|---|
| | Kind | Amount (Parts by Weight) | Kind | Amount (Parts by Weight) | | | | | |
| Example 10 | Iron ethylenediaminetetraacetate | 3.0 | Malonic acid | 2.0 | 3.0 | 2.3 | ◯ | ◯ | ◯ |
| Comparative Example 13 | Sodium ethylenediaminetetraacetate | 3.0 | — | — | 4.3 | 0.9 | ◯ | ◯ | X |

It is seen from the results shown in Table 4 that the polishing compositions where Fe salt or Al salt of the polyaminocarboxlic acid was used have reduced surface roughness and waviness, and the residual abrasive grains are extremely few, and that the polishing rate is remarkably higher especially as compared to a case where Na salt of polyaminocarboxylic acid was used, and an abrasive material having a cumulative particle size distribution at 40 nm from a smaller size side exceeding 25% is contained (Comparative Example 13).

According to the present invention, there are exhibited such an effect that there can be efficiently produced a magnetic disc substrate having little surface defects such as scratches and pits, and improved surface smoothness such as surface roughness (Ra) and waviness (Wa).

What is claimed is:

1. A method for manufacturing a magnetic disk substrate, comprising polishing a magnetic disk substrate with a composition comprising silica particles, water, and Fe salt and/or Al salt of a polyaminocarboxylic acid, and an inorganic acid and/or an organic acid, wherein said composition has a pH of 2.5 to 6.5.

2. The method according to claim 1, wherein said composition has a pH of 2.5 to 5.9.

3. The method according to claim 1, wherein said composition has a pH of 2.5 to 5.5.

4. The method according to claim 1, wherein the silica particles have a particle size distribution such that a ratio of D90 to D50 (D90/D50) is from 1.3 to 3.0, and D50 is from 10 to 600 nm, wherein D90 is defined as a particle size at 90% counted from a smaller size side on a number base in a cumulative particle size distribution, and wherein D50 is defined as a particle size at 50% counted from a smaller size side on a number base in a cumulative particle size distribution.

5. The method according to claim 4, wherein the silica particles have a particle size distribution such that D10 is from 5 to 100 nm, wherein D10 is defined as a particle size at 10% counted from a smaller size side on a number base in a cumulative particle size distribution.

6. The method according to claim 1, wherein the silica particles comprise silica particles A and B, wherein of the silica particles, the silica particles A has the smallest D50 and the silica particles B has the largest D50, and wherein a ratio of the D50 of silica particles B (D50L) to the D50 of silica particles A (D50S) (D50L/D50S) is from 1.1 to 4.0, and a weight ratio of silica particles A to silica particles B [A/B] is from 90/10 to 10/90, wherein D50 is defined as a particle size at 50% counted from a smaller size side on a number base in a cumulative particle distribution.

7. The method according to claim 1, wherein said polyaminocarboxylic acid is selected from the group consisting of ethylenediaminetetraacetic acid, nitrilotriacetic acid, diethylenetriaminepentaacetic acid, dicarboxymethyl glutamic acid and 1,3-propanediamine tetraacetic acid.

8. The method according to claim 1, wherein said inorganic acid and/or said organic acid is selected from the group consisting of hydrochloric acid, sulfuric acid, nitric acid, phosphoric acid, carboxylic acid-based organic acids, phenol-based organic acids, sulfonic acid-based organic acids and phosphoric acid-based organic acids.

9. The method according to claim 1, wherein the amount of silica particles is 0.5 to 50% by weight.

10. The method according to claim 1, wherein the amount of water is 50 to 99.46% by weight.

11. The method according to claim 1, wherein the amount of Fe salt and/or Al salt of a polyaminocarboxylic acid is 0.02 to20% by weight.

12. The method according to claim 1, wherein the amount of an inorganic acid and/or organic acid is 0.02 to 20% by weight.

13. The method according to claim 1, wherein said magnetic disk substrate is made of an aluminum alloy substrate produced by Ni—P plating.

14. The method according to claim 1, wherein the magnetic disk substrate having a surface roughness of 3 Å or less and a waviness of 3 Å or less is obtained.

15. The method according to claim 1, wherein a polishing process comprises two or more steps and wherein polishing using said composition is carried out in a second step or subsequent steps.

16. The method according to claim 15, wherein said magnetic disk substrate having a surface roughness of 2.5 Å or less and a waviness of 2.5 Å or less is obtained.

* * * * *